(12) United States Patent
Huh

(10) Patent No.: US 7,969,421 B2
(45) Date of Patent: Jun. 28, 2011

(54) APPARATUS AND METHOD FOR INPUTTING CHARACTER USING TOUCH SCREEN IN PORTABLE TERMINAL

(75) Inventor: Jung-Chul Huh, Seoul (KR)

(73) Assignee: Samsung Electronics Co., LTD, Suwon-si (KR)

( * ) Notice: Subject to any disclaimer, the term of this patent is extended or adjusted under 35 U.S.C. 154(b) by 1797 days.

(21) Appl. No.: 10/951,250

(22) Filed: Sep. 27, 2004

(65) Prior Publication Data

US 2005/0093826 A1    May 5, 2005

(30) Foreign Application Priority Data

Oct. 29, 2003  (KR) .................. 10-2003-0075739

(51) Int. Cl.
*G06F 3/041* (2006.01)

(52) U.S. Cl. ..................................... 345/173; 345/169

(58) Field of Classification Search .................. 345/163, 345/168–169, 173–178; 715/702
See application file for complete search history.

(56) References Cited

U.S. PATENT DOCUMENTS

| | | | |
|---|---|---|---|
| 5,736,974 A | 4/1998 | Selker | |
| 5,956,021 A | 9/1999 | Kubota et al. | |
| 6,073,036 A * | 6/2000 | Heikkinen et al. | 455/550.1 |
| 6,169,538 B1 | 1/2001 | Nowlan et al. | |
| 6,292,179 B1 | 9/2001 | Lee | |
| 6,573,844 B1 | 6/2003 | Venolia et al. | |
| 6,724,370 B2 | 4/2004 | Dutta et al. | |
| 6,803,905 B1 | 10/2004 | Capps et al. | |
| 6,894,679 B2 | 5/2005 | Suzuki | |
| 7,009,600 B2 * | 3/2006 | Jones et al. | 345/173 |
| 7,075,512 B1 * | 7/2006 | Fabre et al. | 345/156 |
| 7,098,896 B2 | 8/2006 | Kushler et al. | |
| 2004/0004738 A1 * | 1/2004 | Ikeda | 358/1.15 |
| 2004/0160419 A1 | 8/2004 | Padgitt | |
| 2004/0165009 A1 | 8/2004 | Blakely et al. | |
| 2006/0161846 A1 | 7/2006 | Van Leeuwen | |
| 2006/0181519 A1 | 8/2006 | Vernier et al. | |
| 2007/0040813 A1 | 2/2007 | Kushler et al. | |

FOREIGN PATENT DOCUMENTS

| | | |
|---|---|---|
| CN | 1224189 | 7/1999 |
| DE | 103 10 794 A1 | 9/2004 |
| JP | 06-186938 A | 7/1994 |
| JP | 10-269022 A | 10/1998 |
| JP | 2002-62966 | 2/2002 |
| JP | 2002-91677 A | 3/2002 |
| JP | 2003-177848 A | 6/2003 |
| JP | 2004-38407 A | 2/2004 |
| JP | 2005-44026 A | 2/2005 |
| JP | 2005-182487 A | 7/2005 |
| JP | 2005-266850 A | 9/2005 |
| JP | 2006-59238 A | 3/2006 |
| KR | 10-0309108 B1 | 9/2001 |
| WO | WO 9429788 | * 12/1994 |

* cited by examiner

*Primary Examiner* — Chanh Nguyen
*Assistant Examiner* — Pegeman Karimi
(74) *Attorney, Agent, or Firm* — Jefferson IP Law, LLP

(57) ABSTRACT

An apparatus and method for inputting a character using a keyboard displayed on a touch screen in a portable terminal. The apparatus and method determines if a touch signal is generated, with the keyboard displayed. Upon generation of the touch signal, a touched character is recognized by analyzing the touch signal. The character is displayed enlarged in a predetermined screen area. It is then determined if the touch has been completed, while the character is displayed enlarged. Upon sensing the touch completion, the character is displayed in a main screen area.

12 Claims, 3 Drawing Sheets

(a)

(b)

(c)

APPARATUS AND METHOD FOR INPUTTING CHARACTER USING TOUCH SCREEN IN PORTABLE TERMINAL

PRIORITY

This application claims priority under 35 U.S.C. §119 to an application entitled "Apparatus and Method for Inputting Character Using Touch Screen in Portable Terminal" filed in the Korean Intellectual Property Office on Oct. 29, 2003 and assigned Serial No. 2003-75739, the contents of which are incorporated herein by reference.

BACKGROUND OF THE INVENTION

1. Field of the Invention

The present invention relates generally to an apparatus and method for inputting characters using a touch screen in a portable terminal, and in particular, to an apparatus and method for inputting characters without errors.

2. Description of the Related Art

The portable terminal is equipped with a touch screen and its major example is a PDA (Personal Digital Assistant).

In general, the major components of the PDA are a computer, that is, a CPU (Central Process Unit), a memory and an OS (Operating System), and a variety of software programs and peripheral devices based on the OS. The PDA functions to gather, store, form and search information. Recently, the PDA has been developed as a multi-functional device equipped with a portable phone module to enable voice calls and data communications (e.g., Internet browsing).

One popular example of a PDA is the Palm Pilot produced by the Pam Computing Company, and other similar personal, portable digital devices are called PDA. Among products operating on Windows CE of Microsoft, a device using a pen without a keyboard is called PPC (Palm-Sizes PC) and a device using a keyboard is called HPC (Handheld PC). The term "PDA" includes all these devices.

The PDA is usually provided with a touch screen. The touch screen comprises an LCD (Liquid Crystal Display) and a touch panel mounted on the LCD. A user invokes a corresponding application program by touching an icon displayed on the touch screen with his finger or a stylus pen, or by inputting characters through a keyboard displayed in a predetermined area.

A small-size device such as the PDA, however, experiences frequent character editing due to errors caused by the limited screen size. That is, the PDA has the shortcomings of inconvenience and unnecessary time consumption involved in frequent editing.

SUMMARY OF THE INVENTION

It is, therefore, an object of the present invention to provide an apparatus and method for inputting characters without errors through a touch screen in a portable terminal.

It is another object of the present invention to provide an apparatus and method for displaying an input character in a predetermined area of the screen and inputting the displayed character to a main area of the screen upon sensing the completion of the touch when characters are input through a touch screen in a portable terminal.

The above objects are achieved by an apparatus and method for inputting a character using a keyboard displayed on a touch screen in a portable terminal.

According to the present invention, said method comprises: determining if a touch signal is generated, with the keyboard displayed; recognizing a touched character by analyzing the touch signal upon generation of the touch signal; displaying the character enlarged in a predetermined screen area; determining if the touch has been completed, with the character displayed; and displaying the character in a main screen area upon sensing the touch completion.

According to the present invention, said apparatus comprises: a touch screen for displaying a keyboard in its lower portion and generating a touch signal upon sensing a touch on the keyboard in a character input mode; a touch signal receiver for generating position data corresponding to the position of the touch by analyzing the analog touch signal received from the touch screen; and a controller for recognizing a touched character by analyzing the position data received from the touch signal receiver, displaying the character enlarged in a predetermined area of the touch screen, determining if the touch has been completed, and inputting the character at a cursor position upon sensing the completion of the touch.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention relates to a technique for inputting characters without errors using a touch screen in a portable terminal. This invention relates specifically to a method for inputting characters using a touch screen, wherein when the character is input by touching a keyboard displayed on the touch screen, a touched character is displayed in a predetermined area of the screen, and when the completion of the touch is sensed, the character displayed on said area of the screen is inputted to a main area of the screen.

Figure 1:
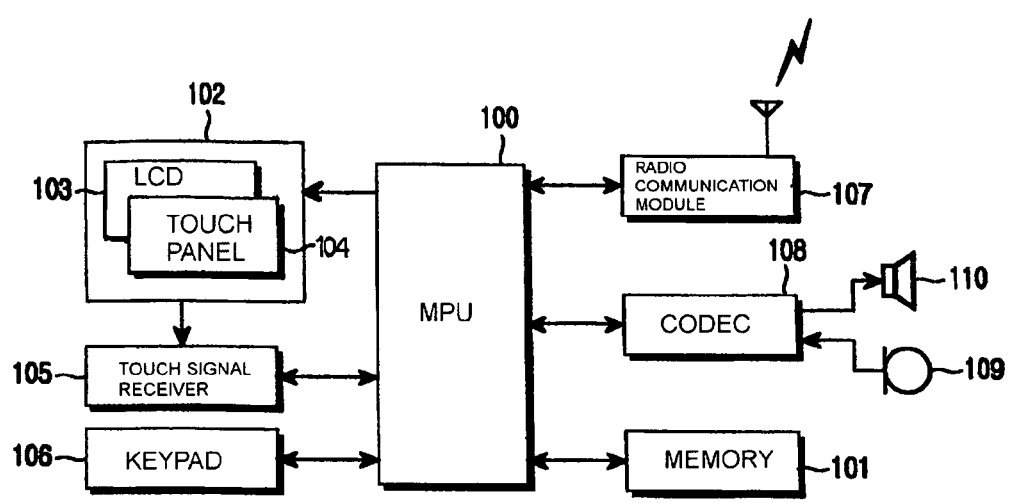
FIG. 1 is a block diagram of a portable terminal according to the present invention.

FIG. 1 is a block diagram of a portable terminal according to the present invention. "Portable terminal" as used herein refers to any terminal having a touch screen, such as a cellular phone, a PCS (Personal Communication System), a PDA, and an IMT-2000 (International Mobile Telecommunication-2000) phone. The following description is made of the common structure of these terminals.

Referring to FIG. 1, an MPU (Micro-Processor Unit) 100 provides overall control to the portable terminal. Specifically, the MPU 100 controls data processing and communication. According to the present invention, in addition to its typical functions, the MPU 100 controls error-free character input when characters are input by touching a keyboard displayed on a touch screen 102. The typical process and control of the MPU 100 are not described herein.

A memory 101 includes a program memory, a data memory, and a non-volatile memory. The program memory stores programs for controlling the entire operation of the portable terminal. It can be a flash memory. The data memory temporarily stores data generated during the operation of the portable terminal. A RAM (Random Access Memory) can be used as the data memory. The non-volatile memory stores phone numbers registered for short dialing and system parameters. The non-volatile memory may be an EEPROM (Electrically Erasable Programmable Read Only Memory).

The touch screen 102 includes an LCD 103 and a touch panel 104 mounted on the LCD 103. The touch screen 102 displays state information generated during the operation of the portable terminal, and can also display moving pictures and still images. The touch screen 102 outputs an electrical analog signal corresponding to a touch to a touch signal receiver 105. The touch signal receiver 105 analyses the electrical analog signal from the touch screen 102 and outputs position data corresponding to the touched position to the MPU 100.

A keypad 106 has a plurality of alphanumeric keys and function buttons. The keypad 106 outputs the MPU 100 button input data corresponding to a pressed button.

A radio communication module 107 is a module for communicating with a base station according to a predetermined communication standard. It can include an RF (Radio Frequency) module and a BBA (BaseBand Analog).

A CODEC (Coder-Decoder) 108 connected to the MPU 100, and a speaker 110 and a microphone 109 connected to the CODEC 108 collectively form a voice input/output block for use in a phone call and voice recording. The CODEC 108 converts PCM (Pulse Code Modulation) data received from the MPU 100 to an analog voice signal and outputs it through the speaker 110. The CODEC 108 also converts a voice signal received through the microphone 109 to PCM data and provides the PCM data to the MPU 100.

Figure 2:
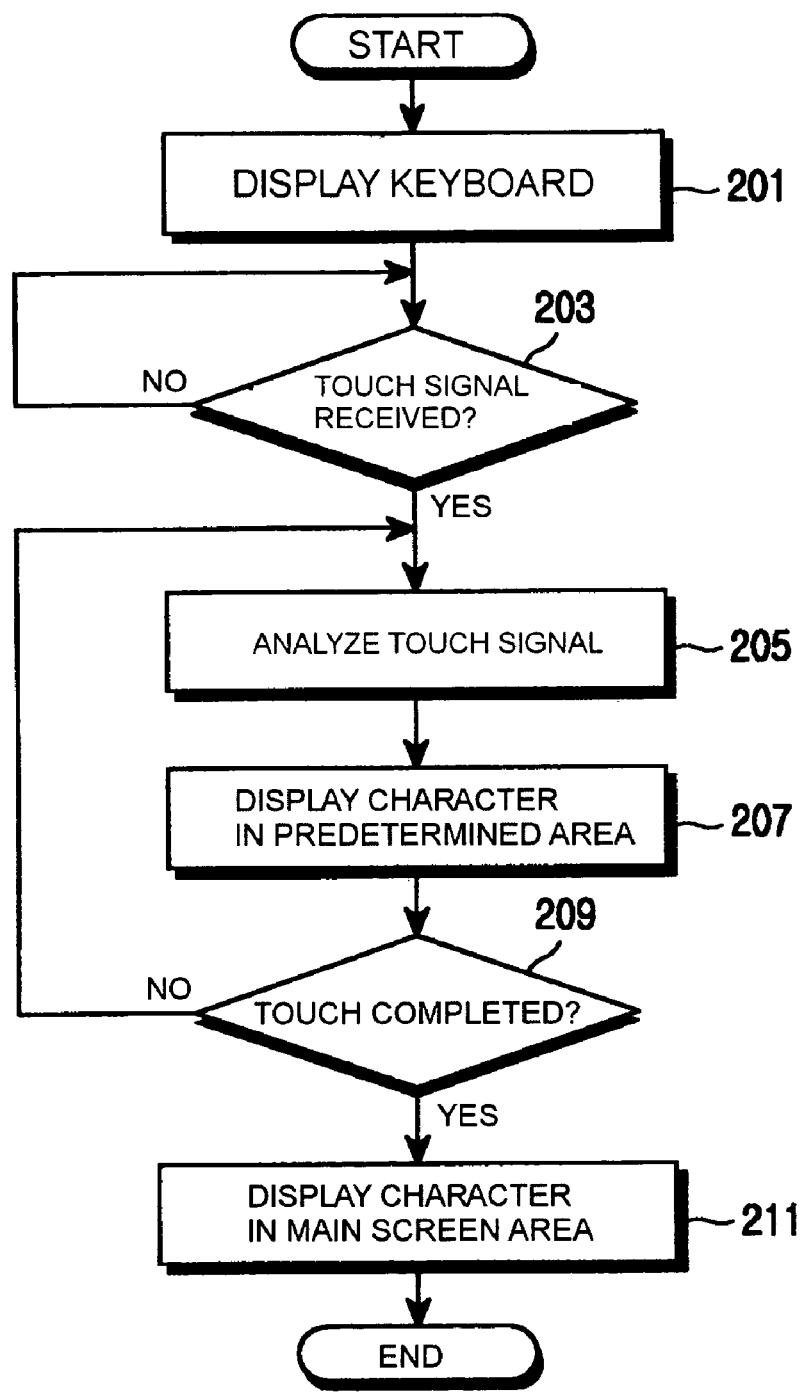
FIG. 2 is a flowchart illustrating an operation for inputting characters without errors when the characters are input by touching a keyboard displayed on a touch screen in the portable terminal according to an embodiment of the present invention.

FIG. 2 is a flowchart illustrating an operation for inputting characters without errors when the characters are input by touching a keyboard displayed on a touch screen in the portable terminal according to an embodiment of the present invention.

Referring to FIG. 2, when a character input mode is set, the MPU 100 first displays a keyboard on a predetermined area (e.g. a lower portion) of the screen in step 201.

With the keyboard displayed, the MPU 100 determines if a touch signal has been received from the touch signal receiver 105 in step 203. Upon receipt of the touch signal, the MPU 100 recognizes a user-touched character by analyzing the touch signal in step 205 and provides an enlarged view of the character in the predetermined screen area in step 207.

In step 209, the MPU 100 decides whether the touch has been completed by analyzing a touch signal received from the touch signal receiver 105. If the touch has not been completed, the MPU 100 returns to step 205. That is, the MPU 100 recognizes a user-touched character by analyzing a touch signal from the touch signal receiver 105 and provides an enlarged view of the character in the predetermined screen area.

On the other hand, upon sensing the completion of the touch, the MPU 100 displays the character in a main area of the screen in step 211 and returns to step 203 to determine if a touch signal has been received. That is, the MPU 100 inputs the character at the position of a cursor on the main screen area.

As described above, a touched character is displayed, enlarged in a predetermined screen area, and input in a main screen area upon sensing the completion of the touch in the present invention. If the touch is not finished, the touched character is not input to the main screen area.

Figure 3:
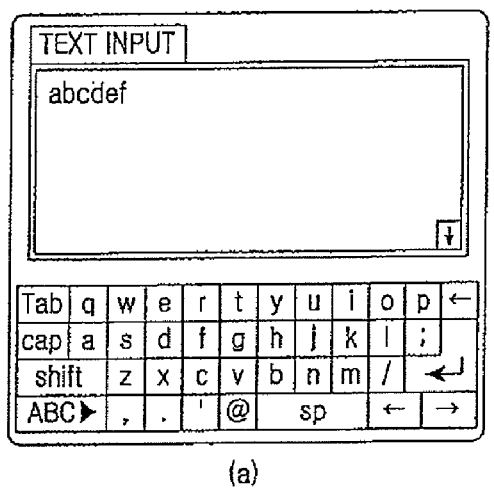
FIG. 3 illustrates screen displays provided when characters are input by touching the keyboard displayed on the touch screen in the portable terminal according to an embodiment of the present invention.
Figure 3:
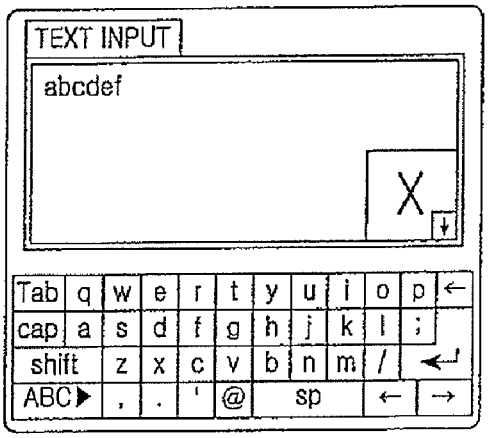
Figure 3:
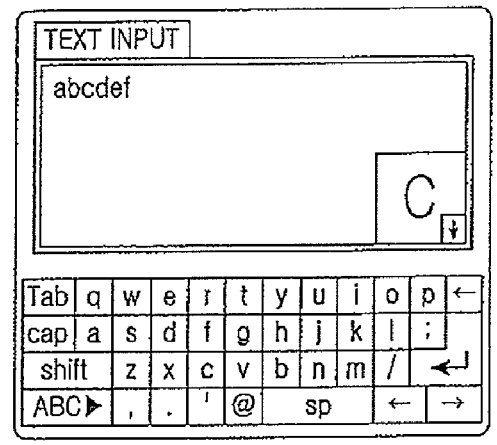

For better understanding of the present invention, an exemplary application will be described in connection with FIG. 3. FIG. 3 illustrates screen displays provided when characters are inputted by touching the keyboard displayed on the touch screen in the portable terminal according to the embodiment of the present invention.

Diagram (a) of FIG. 3 illustrates a screen with input characters displayed in an upper portion and a keyboard displayed in a lower portion. Herein, "abcdef" have already been input. When a user touches "x" on the keyboard in this state, "x" is displayed enlarged in a predetermined screen area as shown in diagram (b) of FIG. 3. Since the user has not finished the touch, "x" is not inputted to a main screen area.

If the user intends to input a "c" instead of an "x", he moves an input tool such as his finger or a stylus pen to the "c", pressing the keyboard. Then "c" is displayed. When the user finished his touch, "c" is displayed in the main screen area as shown in diagram (c) of FIG. 3.

In accordance with the present invention as described above, a touched character is displayed enlarged in a predetermined screen area and input in a main screen area upon sensing the completion of the touch. Therefore, a user can confirm his touched character before it is input, thereby remarkably reducing input errors.

While the invention has been shown and described with reference to a certain preferred embodiment thereof, it is a mere exemplary application. For example, a touched character is displayed enlarged or in its original size at a cursor position in a main screen and input when the touch is completed. In this case, if another touch is sensed without the previous touch being completed, a corresponding new character replaces the previous character. Thus, it will be understood by those skilled in the art that various changes in form and details may be made therein without departing from the spirit and scope of the invention as defined by the appended claims.

What is claimed is:

1. A method for inputting a character in a pocket-sized mobile communication device having a touch screen, comprising:
   displaying a keyboard including a plurality of keys in a first area of the touch screen, wherein the each key of the keyboard has an original touch recognizable area according to a size and location of the key;
   detecting a touch on the original touch recognizable area of a key of the keyboard;
   displaying an enlarged character corresponding only to the key in a fixed second area of the touch screen, away from the first area;
   determining if the touch has been released from the touch recognizable area of the key while displaying the enlarged character corresponding only to the key;
   inputting a character corresponding only to a key where the touch has been released off.

2. The method of claim 1, wherein the touch screen comprises a text input area which comprises the second area.

3. The method of claim 1, wherein the key comprises at least one of an alphanumeric key, a symbol key and a function key.

4. The method of claim 1, further comprising step of:
   removing the displayed enlarged character when the enlarged character is inputted.

5. The method of claim 1, wherein the second area is at least partially outside a vertical perimeter of a touched key.

6. The method of claim 1, further comprising step of:
   detecting a movement of the touch from the original touch recognizable area of the key to an original touch recognizable area of another key wherein the another key has same size as the key;
   removing the enlarged character corresponding to the key in the second area and displaying an enlarged character corresponding only to the another key in the second area if the movement of the touch from the original touch recognizable area of the key to the original touch recognizable area of the another key is detected; and
   determining if the touch has been released from the touch recognizable area of the another key while displaying the enlarged character corresponding only to the another key if the movement is detected.

7. An apparatus for inputting a character in a pocket-sized mobile communication device having a touch screen, comprising:
   means for displaying a keyboard including a plurality of keys in a first area of the touch screen, wherein each key of the keyboard has an original touch recognizable area according to a size and location of the key;
   means for detecting a contact on the original touch recognizable area of a key of the keyboard;
   means for displaying an enlarged character corresponding only to the key in a fixed second area of the touch screen, away from the first area;
   means for determining if the contact has been released while displaying the enlarged character corresponding only to the key; and
   means for inputting a character corresponding only to a key where the touch has been released off.

8. The apparatus of claim 7, wherein the touch screen comprises a text input area which comprises the second area.

9. The apparatus of claim 8, wherein the key comprises at least one of an alphanumeric key, a symbol key and a function key.

10. The apparatus of claim 9, further comprising
    means for detecting a movement of the contact from the original touch recognizable area of the key to an original touch recognizable area of another key, wherein the another key has same size as the key;
    means for removing the enlarged character corresponding to the key in the second area and displaying an enlarged character corresponding only to the another key in the second area if the movement of the contact from the original touch recognizable area of the key to the original touch recognizable area of the another key is detected; and
    determining if the touch has been released from the touch recognizable area of the another key while displaying the enlarged character corresponding only to the another key if the movement is detected.

11. The apparatus of claim 8, further comprising means for removing the displayed enlarged character when the enlarged character is inputted.

12. The apparatus of claim 8, wherein the second area is at least partially outside a vertical perimeter of a touched key.

* * * * *